United States Patent [19]

Brennan et al.

[11] Patent Number: 4,487,852

[45] Date of Patent: Dec. 11, 1984

[54] MODIFIED MANNICH CONDENSATES AND MANUFACTURE OF RIGID POLYURETHANE FOAM WITH ALKOXYLATION PRODUCTS THEREOF

[75] Inventors: Michael E. Brennan; George P. Speranza, both of Austin, Tex.

[73] Assignee: Texaco Inc., White Plains, N.Y.

[21] Appl. No.: 545,421

[22] Filed: Oct. 25, 1983

[51] Int. Cl.³ .................... C08G 18/14; C08G 18/32
[52] U.S. Cl. .................................... 521/167; 252/182; 528/73; 528/78
[58] Field of Search ................ 521/167; 528/78, 73; 252/182

[56] References Cited

U.S. PATENT DOCUMENTS

| | | | |
|---|---|---|---|
| 3,297,597 | 1/1967 | Edwards et al. | 260/2.5 |
| 4,137,265 | 1/1979 | Edwards et al. | 260/570.9 |
| 4,221,875 | 9/1980 | Yukuta et al. | 521/128 |
| 4,317,889 | 3/1982 | Pcolinsky | 521/107 |
| 4,369,258 | 1/1983 | Johnson | 521/107 |

*Primary Examiner*—Herbert S. Cockeram
*Attorney, Agent, or Firm*—Jack H. Park; Kenneth R. Priem

[57] ABSTRACT

The invention relates to Mannich condensates of phenol, formaldehyde and an amine mixture consisting of diethanolamine and melamine which is then alkoxylated with propylene oxide or a mixture of propylene oxide and ethylene oxide. The thus-prepared alkoxylated Mannich condensates are then used as all or a part of the polyol component in making a rigid polyurethane foam having improved fire retardancy properties.

10 Claims, No Drawings

MODIFIED MANNICH CONDENSATES AND MANUFACTURE OF RIGID POLYURETHANE FOAM WITH ALKOXYLATION PRODUCTS THEREOF

BACKGROUND OF THE INVENTION

1. Technical Field of the Invention

This invention relates to Mannich condensates useful as raw materials in the manufacture of rigid polyurethane foam. More particularly, this invention relates to modified Mannich condensates, to alkoxylation products thereof and to the manufacture of rigid polyurethane foams having improved fire retardancy properties from such alkoxylation products. The invention is based upon the discovery that melamine may be used in preparing a particular class of Mannich condensates which, when alkoxylated, may be used for the manufacture of rigid polyurethane foam, having improved fire retardancy properties.

2. Prior Art

Johnson U.S. Pat. No. 4,369,258 is directed to polyurethane foams prepared by reacting a polyisocyanate with a mixture of a melamine polyol with a polyol derived from a polyester or a polyether polyol.

Yukuta et al. U.S. Pat. No. 4,221,875 is directed to rigid polyurethane foams having flame resistance which are prepared from a mixture comprising a polyhydroxy compound such as an ethylene oxide adduct of a material containing a plurality of hydroxyl groups such as sucrose or sorbitol, an organic polyisocyanate, a blowing agent and powdered melamine. From 20 to 60 parts by weight of powdered melamine per 100 parts of polyhydroxy compound are recommended.

Pcolinsky, Jr. U.S. Pat. No. 4,317,889 and the numerous U.S. patents cited therein disclose the use of melamine derivatives such as hydroxymethyl melamines, melamine phosphate, hexaalkoxymethylmelamine, etc. as a component for use in the manufacture of flexible polyurethane foams.

Edwards et al. U.S. Pat. No. 3,297,597 is directed to Mannich condensates of a phenolic compound, formaldehyde, and an alkanolamine which are then alkoxylated, preferably with propylene oxide, to provide polyols useful in the manufacture of rigid polyurethane foams.

Edwards et al. U.S. Pat. No. 4,137,265 is similarly directed to Mannich condensates prepared by reacting phenol with formaldehyde and diethanolamine which are then propoxylated and used in the manufacture of rigid polyurethane foam.

SUMMARY OF THE INVENTION

In one aspect, the present invention is directed to Mannich condensates of phenol, formaldehyde, melamine and diethanolamine. In another aspect, the present invention is directed to the preparation of polyols useful in the manufacture of rigid polyurethane foam. In yet another aspect of the present invention, the polyol based upon the Mannich condensate, as just described, is reacted with an organic polyisocyanate in the presence of a blowing agent, a catalyst, and other appropriate components, in order to manufacture a rigid polyurethane foam having improved fire retardancy properties.

DETAILED DESCRIPTION

The Modified Mannich Condensate

The principal components of the modified polyols of the present invention are melamine, phenol, formaldehyde and diethanolamine.

The Mannich condensates of the present invention are prepared by reacting the phenol with formaldehyde and the amines (diethanolamine and melamine) in the mol ratios of 1 to 3 mols of formaldehyde and 1 to 3 mols of amine mixture per mol of phenolic compound. The amine mixture consists of about 90 to about 99 mol percent of diethanolamine and correspondingly, from about 10 to about 1 mol percent of melamine.

The phenolic compound to be employed in accordance with the present invention is a phenol or a phenol having a hydrogen atom on one or more of the ring positions ortho and para to the hydroxyl group and which is otherwise unsubstituted or substituted with a $C_1$-$C_{12}$ straight chain or branched chain alkyl group. Representative compounds include phenol, methylphenol, ethylphenol, propylphenyl, hexylphenol, nonylphenol, dodecylphenol, etc.

The phenolic compound is reacted with formaldehyde, diethanolamine and melamine. Formaldehyde may be employed in its conventional form, as an aqueous formalin solution, in "inhibited" methanol solution, as paraformaldehyde, or as trioxane.

For example, the Mannich reaction is conducted by premixing the phenolic compound with a desired amount of the diethanolamine and melamine and then slowly adding formaldehyde to the mixture at a temperature below the temperature of Novolak formation (a temperature that will vary with the phenolic compound employed and is a temperature of less than about 45° C. when phenol itself is employed).

At the end of the reaction, water is stripped from the reaction mixture to provide thereby a crude Mannich reaction product. Although it is within the scope of the present invention to separate the crude reaction product by conventional means into specific components or fractions, it is a feature of the present invention that the entire crude Mannich reaction product may be used as such without attempting to isolate the individual components thereof. In fact, in accordance with the preferred embodiment of the present invention, the entire crude Mannich reaction product is used as such.

The polyols of the present invention are prepared by alkoxylating the Mannich condensate with propylene oxide. Propylene oxide is suitably the sole alkylene oxide. However, up to about 10 wt.% of the propylene oxide may be replaced with ethylene oxide. When ethylene oxide is to be used, the ethylene oxide and propylene oxide may be used in admixture to form a heteropolymer, or the ethylene oxide may be added prior to or subsequent to the addition of the propylene oxide to form a block polymer.

The alkoxylation is carried out by introducing the propylene oxide, preferably under pressure, into a vessel containing the Mannich reaction product. No added catalyst is needed since the basic nitrogen in this product provides sufficient catalytic activity to promote the reaction. Temperatures between about 30° C. and about 200° C. may be employed but the preferred temperatures are in the range of about 90° to 120° C. Under these conditions the phenolic hydroxyl group and the alkanolamino hydroxyls are reactive to form hydroxypropyl groups. The final condensation products are separated from unreacted and partially reacted materials by vacuum stripping and are obtained as clear amber to brown liquids having hydroxyl numbers in the range of 400 to 550 and viscosities between about 10,000 and 45,000 centipoises at 25° C.

Manufacture of Rigid Polyurethane Foam

The chemical components utilized for the manufacture of a rigid polyurethane foam are the polyols, an organic polyisocyanate, a blowing agent, a surfactant, a catalyst and suitable fire retardants and other additives.

The polyol component in the present invention comprises a modified propoxylated Mannich condensate as just described used alone or in admixture with from about 0 to about 60 parts by weight of a polyoxypropylene polyol having a hydroxyl number between 200 and 800, preferably, between 300 and 700 and more preferably between about 400 and about 600, and a functionality of 2 to 6, and preferably from about 3 to 6.

Normally, propylene oxide will constitute from about 15 to about 95 wt.% of the total polyol composition, up to about 10 wt.% of ethylene oxide may be utilized if desired, based on the weight of the propylene oxide.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, and trimethylolpropane.

Such above amines or alcohols may be reacted with an alkylene oxide such as, propylene oxide, or mixed ethylene oxide and propylene oxide using techniques known to those skilled in the art. Thus, for example, the reaction of alkylene oxides with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol will determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by ..acting the initiator with a mixture of propylene oxide and ethylene oxide to achieve a random distribution of such alkylene oxides.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl) methane, bis(3-methyl-4-isocyanatophenyl) methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

The more preferred methylene-bridged polyphenyl polyisocyanate mixtures used here contain from about 20 to about 100 wt.% methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt.% methylene diphenyl diisocyanate isomers, of which 20 to about 95 wt.% thereof is the 4,4'-isomer with the remainder being polymethylene polyphenyl polyisocyanates of higher molecular weight and functionality that have an average functionality of from about 2.1 to about 3.5. The isocyanate mixtures are known materials and can be prepared, for example, by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such material are trichloromonofluoromethane, dichlorodifluoromethane, dichloromonofluoromethane, 1,1-dichloro-1-fluoromethane, 1,1-difluoro-1,2,2-trichloroethane, chloropentafluoroethane, and the like. Other useful blowing agents include low-boiling hydrocarbons such as butane, pentane, hexane, cyclohexane, and the like. See U.S. Pat. No. 3,072,582, for example.

The catalysts which may be used to make the foams of our invention are well known. There are two general types of catalyst, tertiary amines and organo-metallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in my invention are triethylenediamine, tetramethylethylenediamine, triethylamine, tripropylamine, tributylamine, triamylamine, pyridine, quinoline, dimethylpiperazine, dimethylhexahydroaniline, dimethylpiperazine, N-ethylmorpholine, dimethylaniline, nicotine, dimethylaminoethanol, tetramethylpropanediamine, and methyltriethylenediamine. Useful organo-metallic compounds as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organo-metallic compound are often used together in the polyurethane reaction.

Conventional formulation ingredients are also employed, such as, for example, foam stabilizers also known as silicone oils or emulsifiers. The foam stabilizer may be an organic silane or siloxane. For example, compounds may be used having the formula:

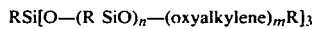

$$RSi[O—(R\ SiO)_n—(oxyalkylene)_mR]_3$$

wherein R is an alkyl group containing from 1 to 4 carbon atoms; n is an integer of from 4 to 8; m is an integer of 20 to 40; and the oxyalkylene groups are derived from propylene oxide and ethylene oxide. See, for example, U.S. Pat. No. 3,194,773.

The flame retardancy of the polyurethane composition can be enhanced by using known fire retardants. Examples of suitable flame retardants are: tris(1,3-dichloropropyl)phosphate, tris(2,3-dibromopropyl)phosphate, 2,2-bis(chloromethyl)-1,3 propylene bis[di(2-chloroethyl)phosphate], tris(2-chloroethyl)phosphate, bis(dichloropropyl)tribromopentyl phosphate, tetrakis(2-chloroethyl)ethylene diphosphate (sold by Olin Chemicals as THERMOLIN®101), FYROL®EFF (oligomeric chloroalkyl phosphate, sold by Stauffer Chemical Co.), tricresyl phosphate, cresyl diphenyl phosphate, chlorinated paraffin, and brominated paraffin. Halogenated phosphates are preferred flame retardants in the practice of this invention, especially tris(1,3-dichloropropyl)phosphate, tris(2-chloroethyl)phosphate, FYROL®EFF, and tetrakis(2-chloroethyl)ethylene disphosphate. Although a single flame retardant is preferred from the standpoint of simplicity of formulation, mixtures of two or more of the same type or of different types may be found to give improved performance in some cases, and such mixtures are included within the scope of this invention. The amount of flame retardant can be varied over a wide range of from about 20 to about 60 parts by weight per 100 parts by weight of polyol in the reaction mixture. It is preferred to use from about 20 to about 40 parts by weight.

The rigid polyurethane foams prepared here can be made in one step by reacting all the ingredients together at once (one-shot process) or the rigid foams can be made by the socalled "quasi-prepolymer method". In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

SPECIFIC EXAMPLES

A. Melamine-Modified Mannich Condensates (5474-07)

Two series of Mannich condensates were prepared. In each series, the base material was a Mannich condensate based on Edwards et al. U.S. Pat. No. 3,297,597. The basic Mannich condensate for the first series was a condensate of phenol, formaldehyde and diethanolamine in the mol ratio of 1:1:1. Subsequent members of the series were prepared by replacing 1, 2, 5 and 10 mol percent of the diethanolamine with the molar equivalent of melamine (i.e., 1/3, 2/3, 5/3 and 10/3 mol percent melamine). The condensates were propoxylated with 3 mols of propylene oxide per mol of phenol.

In similar manner, the base Mannich condensate for the second series was a Mannich condensate of nonylphenol, formaldehyde and diethanolamine, but in this case in the molar ratio of 1:2:2. Again, 1, 2, 5 and 10 mol percent of the diethanolamine was replaced with melamine to prepare the other members of the series (i.e., 2/3, 4/3, 10/3 and 20/3 mol percent of melamine). The Mannich condensates were propoxylated with 4 mols of propylene oxide per mol of phenol. The products that were thus prepared are characterized in the following two tables:

TABLE I

| | First Series (1:1:1:3 Phenol, Formaldehyde, Amine and Propylene Oxide Ratios) | | | | | |
|---|---|---|---|---|---|---|
| DEA Replaced, mole % | 0 | 0 | 1 | 2 | 5 | 10 |
| NB 5474- | lot 1A-410 | 06P | 07P | 08P | 14P | 15P |
| OH No. | 534 | 539 | 564 | 538 | 522 | 522 |
| Total Amine, meq/g | 2.80 | 2.83 | 2.94 | 2.73 | 2.72 | 2.73 |
| Viscosity (25° C.), cs | 14,500 | 16,404 | 29,774 | 22,363 | 19,272 | 25,874 |
| Gardner Color | — | 3–4 | 7–8 | 4–5 | ~4 | 4–5 |
| % Water | 0.02 | 0.02 | 0.01 | 0.02 | 0.01 | 0.01 |
| pH (10/1 MeOH/H$_2$O) | 11.2 | 10.8 | 11.0 | 11.4 | 11.6 | 11.8 |

TABLE II

| | Second Series (1:2:2:4 Nonylphenol, Formaldehyde, Amine and Propylene Oxide Ratios) | | | | | |
|---|---|---|---|---|---|---|
| DEA Replaced, mole % | 0 | 0 | 1 | 2 | 5 | 10 |
| NB 5474- | lot OV-408 | 30P | 31P | 32P | 33P | 34P |
| OH No. | 455 | 452 | 466 | 442 | 436 | 438 |
| Total Amine, meq/g | 3.00 | 3.04 | 3.08 | 2.99 | 2.96 | 2.92 |
| % Nitrogen | 4.20 | 4.36 | 4.34 | 4.32 | 4.61 | 5.12 |
| Viscosity (25° C.), cs | 28,000 | 33,828 | 32,402 | 39,446 | 41,025 | 50,919 |
| Gardner Color | — | 11–12 | 9–10 | 11–12 | 11–12 | ~12 |
| % Water | 0.02 | 0.01 | 0.01 | 0.02 | 0.01 | 0.03 |

TABLE II-continued

Second Series (1:2:2:4 Nonylphenol, Formaldehyde, Amine and Propylene Oxide Ratios)

| DEA Replaced, mole % | 0 | 0 | 1 | 2 | 5 | 10 |
|---|---|---|---|---|---|---|
| NB 5474- | lot OV-408 | 30P | 31P | 32P | 33P | 34P |
| pH (10/1 MeOH/H$_2$O) | 10.6 | 10.8 | 11.0 | 11.1 | 10.5 | 11.4 |

B. Rigid Polyurethane Foam Preparation

Conventional rigid and fire retarded rigid polyurethane foams were prepared from the polyols of Example A. The formulation components were mixed at 2700 rpm and poured into an 8"×8"×12" open mold and allowed to rise. The resulting foams were allowed to stand at room temperature for three days before testing. Formulations and foam physical properties are listed below.

a. Series I (5474-35)

| Formulation, pbw | 1 | 2 | 3 | 4 | 5 | 6B |
|---|---|---|---|---|---|---|
| THANOL R-350-X (OH = 534) | 36.0 | — | — | — | — | — |
| 5474-06P (OH = 539) | — | 35.8 | — | — | — | — |
| -07P (OH = 564) | — | — | 34.9 | — | — | — |
| -08P (OH = 538) | — | — | — | 35.8 | — | — |
| -14P (OH = 522) | — | — | — | — | 36.5 | — |
| -15P (OH = 522) | — | — | — | — | — | 36.5 |
| Silicone DC-193 | 0.5 | → | → | → | → | → |
| Freon R-11B | 13.0 | → | → | → | → | → |
| MONDUR MR (index = 1.10) | 50.5 | 50.7 | 51.6 | 50.7 | 50.0 | 50.0 |
| Times (sec), Mixing | 15 | 15 | 15 | 10 | 8 | 6 |
| Cream | 26 | 26 | 22 | 18 | 10 | 10 |
| Gel | 104 | 84 | 62 | 54 | 44 | 42 |
| Tack Free | 134 | 101 | 96 | 69 | 50 | 55 |
| Rise | 141 | 120 | 115 | 84 | 56 | 69 |
| Initial Surface Friability | None | → | → | → | → | → |
| Foam Appearance | Good | → | → | → | → | → |
| Physical Properties | | | | | | |
| Density, lb/ft$^3$ | 2.05 | 1.98 | 1.93 | 2.05 | 2.01 | 1.89 |
| K-Factor | 0.122 | 0.122 | 0.116 | 0.114 | 0.116 | 0.123 |
| Comp. Str., with rise | 48.89 | 40.56 | 41.33 | 45.01 | 49.90 | 49.26 |
| against rise | 16.17 | 14.12 | 15.90 | 16.75 | 15.83 | 15.10 |
| Heat Distortion, °C. | 171 | 170 | 187 | 177 | 155 | 160 |
| % Closed Cells | 93.2 | 92.0 | 93.1 | 92.7 | 93.4 | 91.9 |
| Friability (% wt. loss, 10 min.) | 3.9 | 5.2 | 3.6 | 3.9 | 3.3 | 3.9 |
| ASTM 1692 BURN, in/min BHA) | 2.124 | 2.346 | 1.656 | 1.908 | 1.830 | 2.196 |

In general, the melamine modified polyols give rigid foams with faster reaction profiles, lower K-factors, at times higher heat distortion temperatures and better burning retardation.

b. Fire Retarded (5474-64)

| Formulation, pbw | 1 | 2 | 3 | 4 |
|---|---|---|---|---|
| THANOL R-350-X (OH = 534) | 31.8 | — | — | — |
| 5474-07P (OH = 564) | — | 30.8 | — | — |
| -08P (OH = 538) | — | — | 31.7 | — |
| -14P (OH = 522) | — | — | — | 32.3 |
| Antiblaze 80 | 10.0 | → | → | → |
| Silicone DC-193 | 0.5 | → | → | → |
| FREON R-118 | 13.0 | → | → | → |
| MONDUR MR (index = 1.10) | 44.7 | 45.7 | 44.8 | 44.2 |
| Times (sec), Mixing | 15 | 15 | 10 | 5 |
| Cream | 30 | 23 | 16 | 6 |
| Gel | 114 | 68 | 61 | 47 |
| Tack Free | 126 | 79 | 97 | 54 |
| Rise | 189 | 119 | 141 | 82 |
| Initial Surface Friability | None | → | → | → |
| Foam Appearance | Good | → | → | → |
| Physical Properties | | | | |
| Density, lb/ft$^3$ | 2.06 | 2.00 | 2.05 | 2.08 |
| K-Factor | 0.132 | 0.122 | 0.124 | 0.120 |
| Comp. Str. (psi), | | | | |
| with rise | 37.09 | 42.33 | 40.54 | 39.97 |
| against rise | 16.17 | — | 16.75 | 16.42 |
| Heat Distortion, °C. | 126 | 128 | 133 | 125 |
| % Closed Cells | 92.3 | 93.5 | 92.9 | 93.4 |
| Friability (% wt. loss, 10 min.) | 3.9 | 3.2 | 2.8 | 1.9 |
| ASTM 1692 BURN, in/min (BHA) | 1.524 | 1.350 | 1.518 | 1.614 |
| Butler Chimney Test | | | | |
| Flame height, in. | >11 | 7.8 | >11 | >11 |
| Sec. to Extinguish | 14 | 13.6 | 13 | 12 |
| % wt. Retained | 75.4 | 79.2 | 75.3 | 84.8 |

In general, the melamine modified polyols give fire retarded rigid foams with faster reaction profiles, lower K-factors, higher compresive strengths and less friability. In some cases, better flame resistance is also realized.

| Formulation, pbw | c. Series II (5474-66, -74 Series) | | | | | |
|---|---|---|---|---|---|---|
| | 5474-66-1 | 74-1 | 74-2 | 74-3 | 74-4 | 74-5 |
| THANOL R-650-X (OH = 455) | 39.4 | — | — | — | — | — |
| 5474-30P (OH = 452) | — | 39.5 | — | — | — | — |
| -31P (OH = 466) | — | — | 38.9 | — | — | — |
| -32P (OH = 442) | — | — | — | 40.0 | — | — |
| -33P (OH = 436) | — | — | — | — | 40.3 | — |
| -34P (OH = 438) | — | — | — | — | — | 40.2 |
| Silicone DC-193 | 0.5 | → | → | → | → | → |
| Freon R-11B | 13.0 | → | → | → | → | → |
| MONDUR MR (index = 1.10) | 47.1 | 47.0 | 47.6 | 46.5 | 46.2 | 46.3 |
| Times (sec), Mixing | 12 | 12 | 12 | 12 | 12 | 8 |
| Cream | 17 | 17 | 18 | 19 | 17 | 12 |
| Gel | 57 | 45 | 58 | 47 | 42 | 33 |
| Tack Free | 62 | 54 | 63 | 53 | 48 | 39 |
| Rise | 99 | 92 | 118 | 120 | 87 | 71 |
| Initial Surface Friability | None | → | → | → | → | → |
| Foam Appearance | Good | → | → | → | → | → |
| Physical Properties | | | | | | |
| Density (lb/ft$^3$) | 2.13 | 2.20 | 3.02 | 2.20 | 2.03 | 2.17 |
| K-Factor | 0.115 | 0.118 | 0.118 | 0.112 | 0.155 | 0.116 |
| Comp. Str. (psi), with rise | 47.86 | 50.72 | 49.96 | 51.94 | 51.17 | 46.79 |
| against rise | 16.25 | 21.30 | 19.73 | 22.05 | 18.70 | 19.64 |
| Heat Distortion, °C. | 155 | 170 | 163 | 164 | 160 | 161 |
| % Closed Cells | 93.2 | 92.9 | 93.0 | 92.9 | 89.1 | 92.9 |
| Friability (% wt. loss, 10 min.) | 3.5 | 6.0 | 4.2 | 3.6 | 8.1 | 3.5 |
| ASTM 1692 BURN, in/min (BHA) | 2.970 | 2.286 | 2.292 | 2.580 | 5.000 | 2.166 |
| Butler Chimney Test | | | | | | |
| Flame height, in. | >11 | >11 | >11 | >11 | >11 | >11 |
| Sec. to extinguish | 36 | 36 | 35 | 34 | 38 | 29 |
| % wt. retained | 26.7 | 35.7 | 29.1 | 46.3 | 23.8 | 58.4 |

In general, the melamine modified polymers give rigid foams with faster reaction profiles, increased compressive strengths and higher heat distortion temperatures. In select cases, better burn properties are also realized.

| Formulation, pbw | d. Fire Retarded (5474-75) | | | | |
|---|---|---|---|---|---|
| | 5474-75-1 | 75-2 | 75-3 | 75-4 | 75-5 |
| THANOL R-650-X (OH = 455) | 34.8 | — | — | — | — |
| 5474-31P (OH = 466) | — | 34.4 | — | — | — |
| 32P (OH = 442) | — | — | 35.4 | — | — |
| 33P (OH = 436) | — | — | — | 35.6 | — |
| 34P (OH = 438) | — | — | — | — | 35.5 |
| Antiblaze 80 | 10.0 | → | → | → | → |
| Silicone DC-193 | 0.5 | → | → | → | → |
| Freon R-11B | 13.0 | → | → | → | → |
| MONDUR MR (index = 1.10) | 41.7 | 42.1 | 41.1 | 40.9 | 41.0 |
| Times (sec), Mixing | 12 | 12 | 12 | 12 | 10 |
| Cream | 17 | 18 | 16 | 17 | 15 |
| Gel | 65 | 60 | 62 | 57 | 47 |
| Tack Free | 78 | 68 | 69 | 62 | 53 |
| Rise | 114 | 119 | 108 | 111 | 105 |
| Initial Surface Friability | None | → | → | → | → |
| Foam Appearance | Good | → | → | → | → |
| Physical Properties | | | | | |
| Density, lbs/ft$^3$ | 2.28 | 2.24 | 2.28 | 2.33 | 2.25 |
| K-Factor | 0.123 | 0.118 | 0.115 | 0.119 | 0.116 |
| % Closed Cells | 92.6 | 92.8 | 93.1 | 92.1 | 92.8 |
| ASTM 1692 BURN, in/min (BHA) | 1.422 | 1.416 | 1.326 | 1.446 | 1.698 |
| Butler Chimney Test | | | | | |
| Flame height, in. | 8.0 | 8.3 | 8.2 | 7.8 | >11 |
| Sec. to extinguish | 11.5 | 11.0 | 10.5 | 10.8 | 11 |
| % wt. retained | 81.0 | 81.2 | 81.7 | 80.4 | 78.2 |

In general, the melamine modified polyols give fire retarded rigid foams with faster reaction profiles and lower K-factors. In some cases, better flame resistance is also realized.

It will be understood that the foregoing examples are given by way of illustration only and not by way of limitation and that the scope of the present invention is defined solely by the appended claims.

What is claimed is:

1. An alkoxylation product of a Mannich condensate prepared by reacting a phenolic component with 1 to 3 mols of formaldehyde and 1 to 3 mols of an amine mixture per mol of said phenolic component and thereafter reacting said Mannich condensate with from about 20 to about 50 wt.% of an alkylene oxide component, said phenolic component comprising phenol or a phenol substituted with an alkyl group containing 1 to 12 carbon atoms, said amine mixture consisting of about 90 to 99 mol percent of diethanolamine and, correspondingly, about 10 to 1 mol percent of melamine, said alkylene oxide component comprising from 90 to 100 wt.% of propylene oxide and, correspondingly, from 0 to 10 wt. percent of ethylene oxide.

2. An alkoxylation product as in claim 1 wherein the Mannich Condensate is a condensate of equimolar amounts of phenol, formaldehyde and said amine mixture, wherein the alkylene oxide component consists of propylene oxide and wherein the alkoxylation product has a hydroxyl number within thge range of about 500 to 650.

3. An alkoxylation product as in claim 1 wherein the Mannich condensate is a condensate of nonylphenol, formaldehyde and said amine mixture reacted in the molar ratio of about 2 mols of formaldehyde and 2 mols of said amine mixture per mol of nonylphenol, wherein the alkylene oxide component consists of propylene oxide and wherein the said alkoxylation product has a hydroxyl number within the range of about 400 to 500.

4. A method of preparing a polyol composition which comprises preparing a Mannich condensate by reacting a phenolic component with formaldehyde and an amine mixture in the molar ratio of about 1 to about 3 mols of formaldehyde and from about 1 to about 3 mols of amine mixture per mol of said phenolic component, while removing by-product water of reaction, and thereafter reacting the said Mannich condensate with from about 20 to about 50 wt.% of an alkylene oxide component comprising from 100 to about 90 wt.% of propylene oxide and from 0 to about 10 wt.% of ethylene oxide, said amine mixture consisting of about 90 to about 99 mol percent of diethanolamine and from about 10 to about 1 mol percent of melamine, said phenolic component comprising phenol or an alkylphenol having an alkyl group containing 1 to 12 carbon atoms.

5. A method as in claim 4 wherein the Mannich condensate is prepared by reacting equimolar amounts of formaldehyde and amine mixture with phenol and wherein the alkylene oxide component consists of propylene oxide.

6. A method as in claim 4 wherein the Mannich condensate is prepared by reacting nonylphenol with formaldehyde and said amine mixture in the molar ratio of about 2 mols of formaldehyde and about 2 mols of said amine mixture per mol of nonylphenol, and wherein the alkylene oxide component consists of propylene oxide.

7. A method of preparing a rigid polyurethane foam composition having improved fire retardancy properties which comprises:
  reacting an excess of an aromatic polyisocyanate with a polyol component in the presence of a catalyst, a blowing agent, a surfactant and a fire retardant;
  said polyol component comprising 100 to about 40 wt.% of an alkoxylation product of an alkylene oxide component and a Mannich condensate component, said alkoxylation product having a hydroxyl number of about 400 to about 550 and, correspondingly, from 0 to about 60 wt.% of a condensate of an initiator having 2 to 6 carbon atoms with an alkylene oxide component, said condensate having a hydroxyl number of about 200 to about 800;
  said Mannich Condensate Component having been prepared by reacting a phenolic component with formaldehyde and an amine mixture in the molar ratio of about 1 to about 3 mols of formaldehyde and about 1 to about 3 mols of said amine mixture per mol of phenolic component
  said amine mixture consisting of 90 to 99 mol percent of diethanolamine and, correspondingly, from 10 to 1 mol percent of melamine;
  said phenolic component comprising phenol or phenol substituted with an alkyl group constaining 1 to 12 carbon atoms,
  said alkylene oxide component comprising 100 to about 90 wt.% of propylene oxide and, correspondingly, from 0 to about 10 wt.% of ethylene oxide.

8. A method as in claim 7 wherein said Mannich condensate is a Mannich condensate of phenol, formaldehyde and amine mixture in equimolar proportions.

9. A method as in claim 7 wherein the Mannich condensate is a Mannich condensate of nonylphenol, formaldehyde and amine mixture in the molar ratio of about 2 mols of formaldehyde and 2 mols of amine mixture per mol of nonylphenol.

10. A polyurethane composition prepared by the process of claim 7.

* * * * *